United States Patent
Mercier et al.

(10) Patent No.: US 9,879,599 B2
(45) Date of Patent: Jan. 30, 2018

(54) NACELLE ANTI-ICE VALVE UTILIZED AS COMPRESSOR STABILITY BLEED VALVE DURING STARTING

(71) Applicant: United Technologies Corporation, Hartford, CT (US)

(72) Inventors: Claude Mercier, South Windsor, CT (US); Gary Collopy, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 699 days.

(21) Appl. No.: 13/731,133

(22) Filed: Dec. 31, 2012

(65) Prior Publication Data
US 2014/0245749 A1 Sep. 4, 2014

Related U.S. Application Data

(60) Provisional application No. 61/706,367, filed on Sep. 27, 2012.

(51) Int. Cl.

| | |
|---|---|
| *F02C 7/047* | (2006.01) |
| *F02C 9/18* | (2006.01) |
| *F02C 7/26* | (2006.01) |
| *F02C 9/52* | (2006.01) |
| *F02C 6/08* | (2006.01) |
| *B64D 15/04* | (2006.01) |
| *F02C 9/28* | (2006.01) |

(Continued)

(52) U.S. Cl.
CPC .............. *F02C 7/047* (2013.01); *B64D 15/04* (2013.01); *F02C 6/08* (2013.01); *F02C 7/26* (2013.01); *F02C 9/18* (2013.01); *F02C 9/52* (2013.01); *B64D 2033/0233* (2013.01); *F01D 25/02* (2013.01); *F02C 9/28* (2013.01); *F05D 2270/101* (2013.01)

(58) Field of Classification Search
USPC .......... 60/785, 39.093, 39.1, 782; 244/134 R; 416/94, 245 R
See application file for complete search history.

(56) References Cited

U.S. PATENT DOCUMENTS

| | | | | |
|---|---|---|---|---|
| 2,747,365 | A | * | 5/1956 | Rainbow ..................... 60/39.093 |
| 3,057,154 | A | * | 10/1962 | Sherlaw et al. ........... 60/39.093 |
| 3,792,584 | A | * | 2/1974 | Klees ............................. 60/204 |

(Continued)

FOREIGN PATENT DOCUMENTS

EP 2492199 A2 8/2012

OTHER PUBLICATIONS

International Search Report and Written Opinion for International Application No. PCT/US2013/061367 completed on Jan. 15, 2014.

(Continued)

*Primary Examiner* — Pascal M Bui Pho
*Assistant Examiner* — Rene Ford
(74) *Attorney, Agent, or Firm* — Carlson, Gaskey & Olds, PC

(57) ABSTRACT

A gas turbine engine has a compressor section received within an inner housing. An is an outer housing is spaced radially outwardly of the inner core housing. A nacelle has an anti-icing system which taps compressed air from the compressor section through an anti-ice valve and to the nacelle. The anti-ice valve is opened at startup of the gas turbine engine to assist compressor stability.

20 Claims, 3 Drawing Sheets

(51) Int. Cl.
  *F01D 25/02* (2006.01)
  *B64D 33/02* (2006.01)

(56) References Cited

U.S. PATENT DOCUMENTS

| | | | |
|---|---|---|---|
| B535,928 | I5 | 1/1976 | Shah |
| 3,981,466 | A * | 9/1976 | Shah .......................... 244/134 R |
| 4,463,552 | A * | 8/1984 | Monhardt et al. ........... 60/226.1 |
| 4,482,114 | A * | 11/1984 | Gupta et al. ............... 244/134 B |
| 4,738,416 | A | 4/1988 | Birbragher |
| 4,783,026 | A * | 11/1988 | Rumford et al. ......... 244/134 R |
| 4,831,819 | A | 5/1989 | Norris et al. |
| 5,261,228 | A * | 11/1993 | Shuba ........................... 60/226.3 |
| 6,267,328 | B1 * | 7/2001 | Vest ........................... 244/134 B |
| 6,354,538 | B1 * | 3/2002 | Chilukuri ................... 244/134 B |
| 6,371,411 | B1 * | 4/2002 | Breer et al. ................ 244/134 R |
| 7,131,612 | B2 | 11/2006 | Baptist et al. |
| 7,874,137 | B2 | 1/2011 | Chaney et al. |
| 7,900,872 | B2 | 3/2011 | Sternberger |
| 2002/0047070 | A1 * | 4/2002 | Breer et al. ................ 244/134 R |
| 2002/0179773 | A1 * | 12/2002 | Breer et al. ................ 244/134 R |
| 2009/0108134 | A1 * | 4/2009 | Thodiyil et al. ........... 244/134 B |
| 2009/0208328 | A1 * | 8/2009 | Stern ............................. 415/145 |
| 2010/0001138 | A1 | 1/2010 | Dasilva et al. |
| 2010/0105516 | A1 * | 4/2010 | Sheridan et al. ............. 475/346 |
| 2010/0162683 | A1 * | 7/2010 | Grabowski et al. ......... 60/226.3 |
| 2010/0281880 | A1 | 11/2010 | Porte |
| 2011/0146297 | A1 * | 6/2011 | Balandier et al. .............. 60/785 |
| 2011/0167790 | A1 * | 7/2011 | Cloft et al. ................... 60/226.2 |
| 2011/0289936 | A1 * | 12/2011 | Suciu et al. ..................... 60/802 |
| 2012/0073263 | A1 | 3/2012 | Kohlenberg et al. |
| 2012/0124964 | A1 | 5/2012 | Hasel et al. |
| 2012/0255274 | A1 * | 10/2012 | Hummel et al. ........... 60/39.093 |
| 2013/0187007 | A1 * | 7/2013 | Mackin et al. ........... 244/134 R |

OTHER PUBLICATIONS

International Preliminary Report on Patentability for International Application No. PCT/US2013/061367 mailed Apr. 9, 2015.
Supplementary European Search Report for European Application No. 13842277.9 completed Mar. 30, 2016.

* cited by examiner

NACELLE ANTI-ICE VALVE UTILIZED AS COMPRESSOR STABILITY BLEED VALVE DURING STARTING

BACKGROUND OF THE INVENTION

This application relates to a gas turbine engine wherein a nacelle anti-ice valve provides a startup bleed valve function.

Gas turbine engines are known, and typically include a fan delivering air into a bypass duct defined within a nacelle, and also into a core engine. The air in the core engine flow passes through a compressor section, and then into a combustion section. In the combustion section the air is mixed with fuel and ignited, and products of this combustion pass downstream over turbine rotors.

There are many challenges in the design of a gas turbine engine. One challenge occurs at startup. There is typically a large load on the compressor as it begins rotating at startup. Thus, it is known to have a bleed valve in place that opens to allow the partially compressed air to be dumped out of the compressor section. In many engines, there are a plurality of these bleed valves.

It is also known to provide a nacelle anti-icing system. The nacelle anti-icing system typically will tap hot air from the compressor section, and selectively deliver it to the lip of the nacelle to provide anti-icing at the lip of the nacelle. This anti-icing function is performed selectively, and is not necessary during much of the operation of a gas turbine engine on an aircraft. However, when conditions indicate that there may be icing at the lip of the nacelle, the valve may be opened to deliver the hot air to that location.

In the prior art, the use of plural compressor stability bleed valves increases the complexity of the system. Further, should one of these bleed valves fail, air would be continuously bled from the compressor section. This would be undesirable, as the efficiency of the engine would be reduced and the hot air could damage other components positioned in the core.

SUMMARY OF THE INVENTION

In a featured embodiment, a gas turbine engine has a compressor section received within an inner housing. An outer housing is spaced radially outwardly of the inner housing. A nacelle is also included. A nacelle anti-icing system taps compressed air from the compressor section through an anti-ice valve and to the nacelle. The anti-ice valve is opened at startup of the gas turbine engine for the purpose of compressor stability assistance.

In another embodiment according to the previous embodiment, the anti-ice valve is normally open, but may be closed by a control.

In another embodiment according to any of the previous embodiments, the anti-ice system includes a nozzle positioned adjacent an upstream lip of the nacelle.

In another embodiment according to any of the previous embodiments, a compressor stability bleed valve is positioned in the inner housing for selectively dumping air that has been at least partially compressed. The bleed valve is also opened at startup.

In another embodiment according to any of the previous embodiments, the anti-ice valve is opened at startup of the gas turbine engine, without regard to ambient conditions.

In another embodiment according to any of the previous embodiments, a fan is included in the gas turbine engine, and delivers air into a bypass duct inwardly of the nacelle, and also into the compressor section.

In another embodiment according to any of the previous embodiments, a bypass ratio can be described as the volume of air passing into the bypass duct compared to the volume of air passing into the compressor. The bypass ratio is greater than about 6.

In another embodiment according to any of the previous embodiments, the bypass ratio is greater than about 10.

In another embodiment according to any of the previous embodiments, the fan is driven by a turbine that is included in the gas turbine engine. A gear reduction is positioned between the fan and turbine.

In another embodiment according to any of the previous embodiments, a gear ratio of the gear reduction is greater than about 2.3.

In another embodiment according to any of the previous embodiments, the gear reduction is greater than about 2.5.

In another embodiment according to any of the previous embodiments, a fan is included in the gas turbine engine, and delivers air into a bypass duct inwardly of the nacelle, and also into the compressor section.

In another embodiment according to any of the previous embodiments, a bypass ratio can be described as the volume of air passing into the bypass duct compared to the volume of air passing into the compressor. The bypass ratio is greater than about 6.

In another embodiment according to any of the previous embodiments, the bypass ratio is greater than about 10.

In another embodiment according to any of the previous embodiments, the fan is driven by a turbine that is included in the gas turbine engine. A gear reduction is positioned between the fan and turbine.

In another embodiment according to any of the previous embodiments, a gear ratio of the gear reduction is greater than about 2.3.

In another embodiment according to any of the previous embodiments, the gear reduction is greater than about 2.5.

In another featured embodiment, a gas turbine engine has a compressor section received within an inner housing. An outer housing is spaced radially outwardly of the inner housing. A nacelle is also included. A compressor stability bleed valve in the inner housing selectively dumps air that has been at least partially compressed in the compressor section into a space between the inner and outer housings. A nacelle anti-icing system taps compressed air from the compressor section through an anti-ice valve and to the nacelle. The anti-ice valve and bleed valve are opened at startup of the gas turbine engine. The anti-ice valve is normally open, but may be closed by a control. The anti-ice system includes a nozzle positioned adjacent an upstream lip of the nacelle. The anti-ice valve is opened at startup without regard to ambient conditions.

In another embodiment according to the previous embodiment, a fan is included in the gas turbine engine, and delivers air into a bypass duct inwardly of the nacelle, and also into the compressor section.

In another embodiment according to any of the previous embodiments, a bypass ratio can be described as the volume of air passing into the bypass duct compared to the volume of air passing into the compressor. The bypass ratio is greater than about 6.

DETAILED DESCRIPTION

Figure 1:
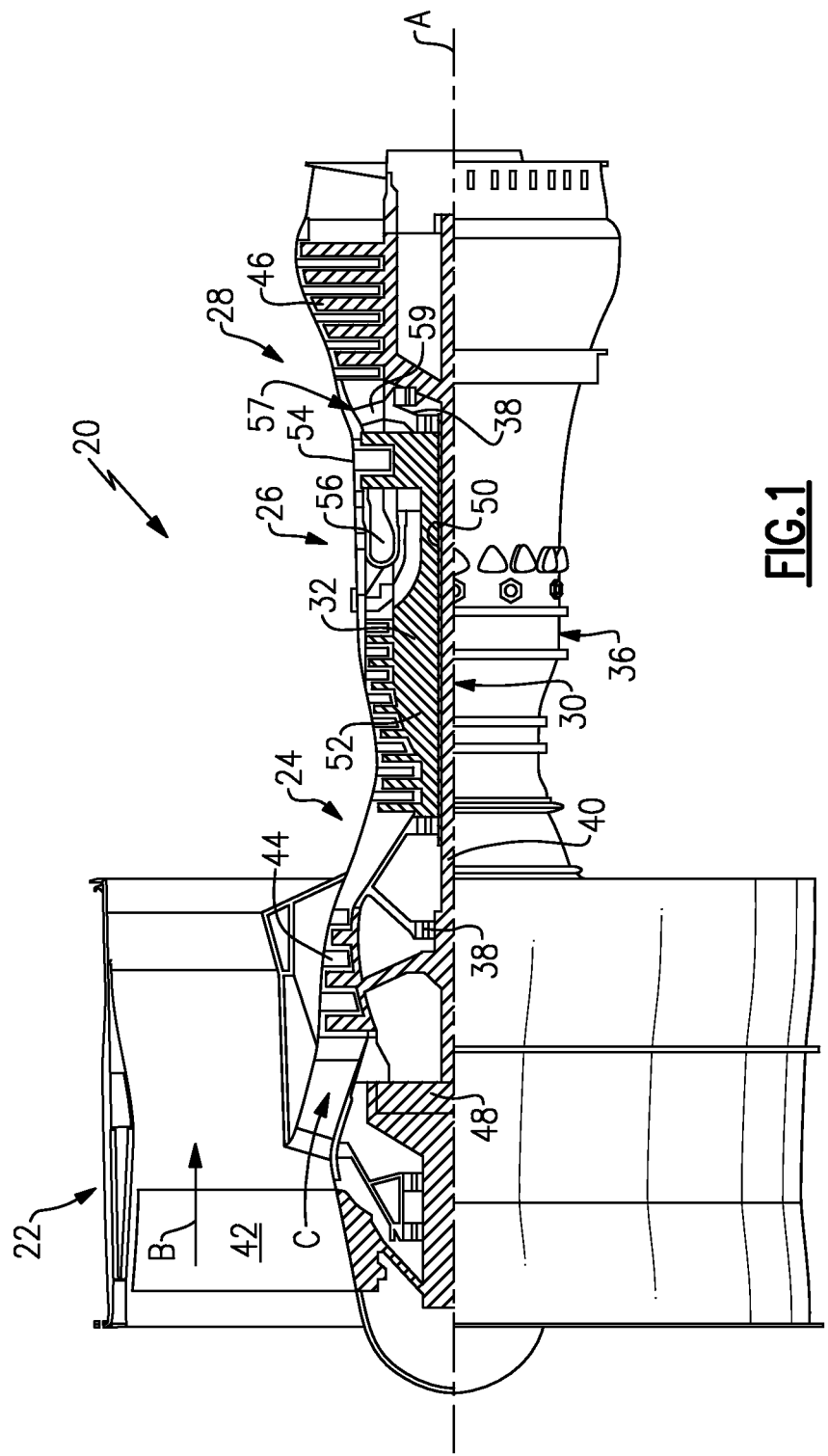
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B in a bypass duct inwardly of a nacelle 80. The compressor section 24 receives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low pressure spool 30 generally includes an inner shaft 40 that interconnects a fan 42, a low pressure compressor 44 and a low pressure turbine 46. The inner shaft 40 is connected to the fan 42, directly or through a geared architecture 48 to drive the fan 42 at a lower speed than the low speed spool 30. The high pressure spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°R)/(518.7° \text{ R})]^{0.5}$. The "Low corrected fan tip speed" as disclosed herein according to one non-limiting embodiment is less than about 1150 ft/second.

Figure 2:
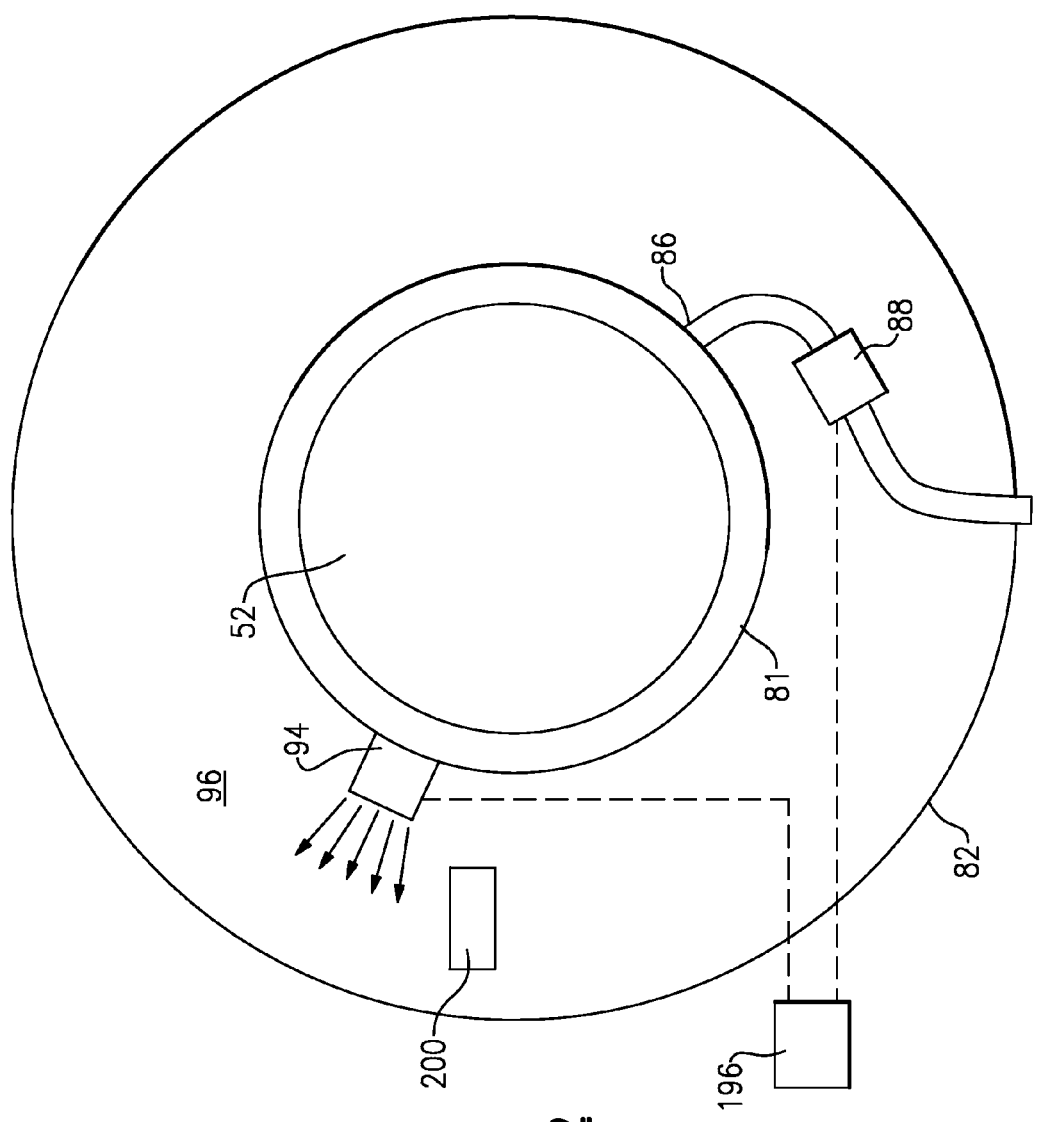
FIG. 2 is a cross-section through a high pressure compressor section.

FIG. 2 shows the compressor section 52 having an inner wall 81, and an outer wall 82. These features may be part of a gas turbine engine generally as disclosed in FIG. 1.

The compressor section is provided with a compressor stability bleed valve 94. This valve is under the control of a control 196 which selectively opens the bleed valve 94 during engine startup such that compressed air is dumped outwardly of the compressor section 52 into a chamber 96. This reduces the load on the compressor rotors as they begin to rotate. As can be appreciated, the compressor stability bleed valve 94 dumps air into the chamber 96, and thus, components 200, shown schematically, within the space 96 are exposed to this hot air.

The control 196 also controls an anti-ice valve 88. The anti-ice valve 88 also includes a tap 86 for tapping compressed air. As would be understood by someone who works in this art, this compressed air would be hot.

Figure 3:
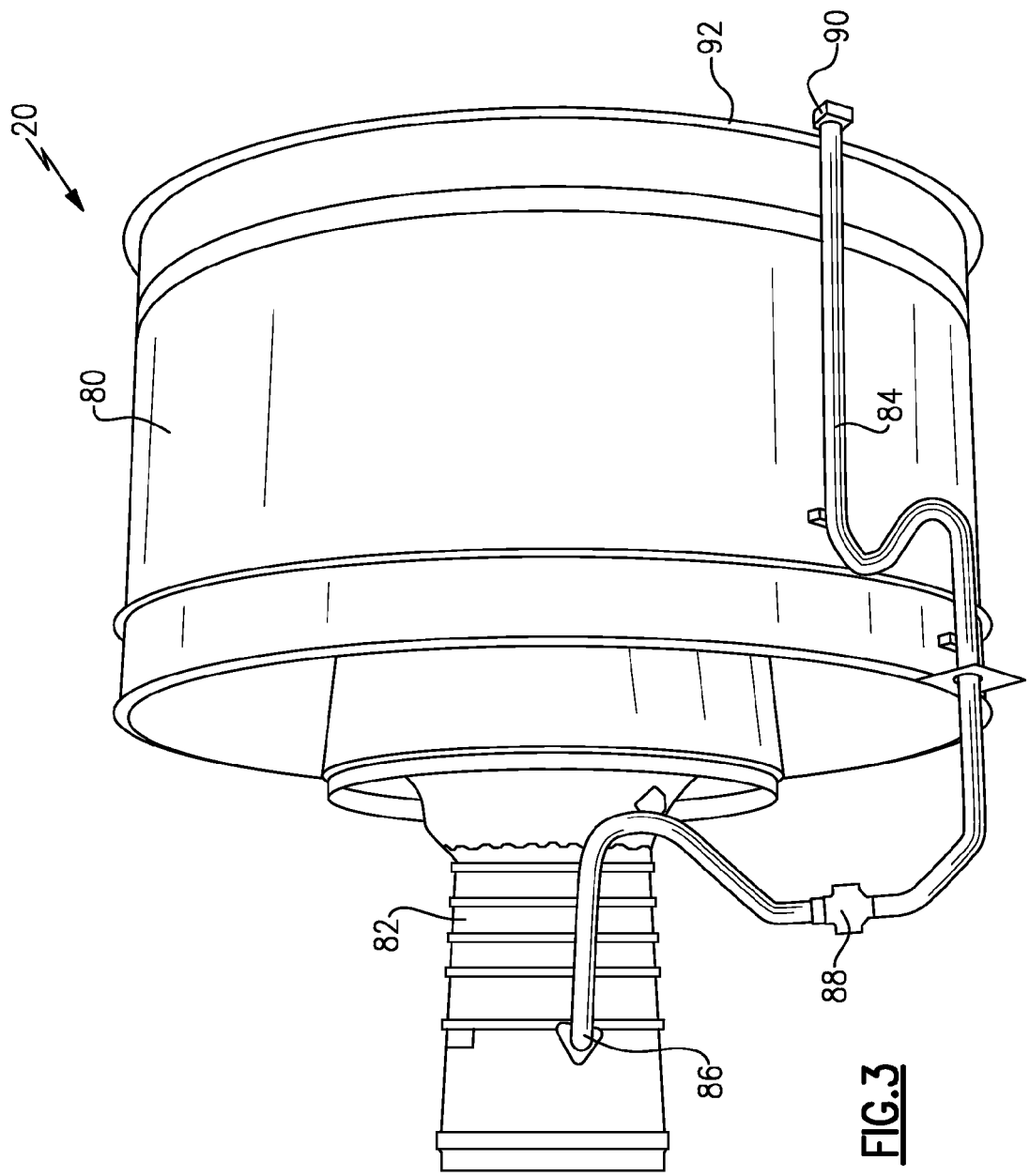
FIG. 3 shows details of a gas turbine engine.

As shown in FIG. 3, the tap 86 passes through the anti-ice valve 88, into a conduit 84, and then to a nozzle 90 associated with a lip 92 at an upstream end of the nacelle 80.

The nozzle 90 would shoot air in opposed circumferential directions such that the lip 92 is provided with this hot air, should conditions indicate that there may be icing. Typically, the anti-ice valve 88 would not be left open at all times, as that would reduce the efficiency of the compressor.

In the prior art, the anti-ice valve 88 is normally closed, however, a control will open the valve when conditions indicate icing. In general, the anti-ice valve 88 has remained closed at startup, when the compressor stability bleed valves might open. In some cases, an anti-ice valve may have been opened at startup, but only if ambient conditions dictated the use. The present control algorithm would ensure the anti-ice valve is opened at startup, without consideration of ambient conditions. Further, while the specific embodiment does include both a bleed valve 94, and the anti-ice valve 88, it is possible the anti-ice valve 88 could be utilized on its own within the scope of this disclosure.

In the present application, the control 196 may open the anti-ice valve 88 at startup. Alternatively, the anti-ice valve 88 may be designed such that it is normally opened, and is left open at startup. In such an arrangement, the control 196 would be operable to close the valve 88 when conditions do not warrant the tapping of hot air for an anti-icing function. That is, the anti-ice valve is opened in an unactuated state, but can be actuated to be closed.

Thus, the present invention utilizes the anti-ice valve 88 to perform not only the anti-ice function, but also to provide a compressor stability bleed valve. This thus eliminates the need for plural bleed valves. Further, should the valve 88 fail, it is directing hot air to a less sensitive area than does bleed valve 94.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a compressor section received within a housing, and a nacelle; and
   a nacelle anti-icing system configured to tap compressed air from said compressor section through an anti-ice valve and to said nacelle, a control for said anti-ice valve configured to have said anti-ice valve opened at startup of the gas turbine engine for the purpose of compressor stability assistance.

2. The gas turbine engine as set forth in claim 1, wherein said anti-ice valve is open in an unactuated state, but said control is configured to selectively actuate said anti-ice valve to be closed by the control.

3. The gas turbine engine as set forth in claim 1, wherein said anti-ice system includes a nozzle positioned adjacent an upstream lip of said nacelle.

4. The gas turbine engine as set forth in claim 1, wherein a compressor stability bleed valve is positioned for selectively dumping air which has been at least partially compressed and said bleed valve also being opened at startup.

5. The gas turbine engine as set forth in claim 1, wherein said control has said anti-ice valve opened at startup of the gas turbine engine, without regard to ambient conditions.

6. The gas turbine engine as set forth in claim 1, wherein a fan is included in the gas turbine engine, and said fan delivering air into a bypass duct inwardly of said nacelle, and also delivering air into said compressor section.

7. The gas turbine engine as set forth in claim 6, wherein a bypass ratio is defined as the volume of air passing into said bypass duct compared to the volume of air passing into said compressor, and said bypass ratio being greater than about 6.

8. The gas turbine engine as set forth in claim 7, wherein said bypass ratio is greater than about 10.

9. The gas turbine engine as set forth in claim 6, wherein said fan is driven by a turbine that is included in said gas turbine engine, and a gear reduction is positioned between said fan and said turbine.

10. The gas turbine engine as set forth in claim 9, wherein a gear ratio of said gear reduction is greater than about 2.3.

11. The gas turbine engine as set forth in claim 10, wherein said gear reduction is greater than about 2.5.

12. The gas turbine engine as set forth in claim 1, wherein a fan is included in the gas turbine engine, and said fan delivering air into a bypass duct inwardly of said nacelle, and also delivering air into said compressor section.

13. The gas turbine engine as set forth in claim 12, wherein a bypass ratio is defined as the volume of air passing into said bypass duct compared to the volume of air passing into said compressor, and said bypass ratio being greater than about 6.

14. The gas turbine engine as set forth in claim 13, wherein said bypass ratio is greater than about 10.

15. The gas turbine engine as set forth in claim 12, wherein said fan is driven by a turbine that is included in said gas turbine engine, and a gear reduction is positioned between said fan and said turbine.

16. The gas turbine engine as set forth in claim 15, wherein a gear ratio of said gear reduction is greater than about 2.3.

17. The gas turbine engine as set forth in claim 16, wherein said gear reduction is greater than about 2.5.

18. A gas turbine engine comprising:
   a compressor section received within an inner housing, and a nacelle;
   a compressor stability bleed valve for selectively dumping air which has been at least partially compressed in said compressor section into a space between said inner and outer housing and an outer housing, and a nacelle anti-icing system for tapping compressed air from said compressor section through an anti-ice valve and to said nacelle, said anti-ice valve and said bleed valve being opened at startup of the gas turbine engine;
   said anti-ice valve is open in an unactuated state; and
   said anti-ice system includes a nozzle positioned adjacent an upstream lip of said nacelle, and said control configured to leave said anti-ice valve opened at startup without regard to ambient conditions, and said valve is selectively actuable to move to a closed state.

19. The gas turbine engine as set forth in claim 18, wherein a fan is included in the gas turbine engine, and said fan delivering air into a bypass duct inwardly of said nacelle, and also delivering air into said compressor section.

20. The gas turbine engine as set forth in claim 19, wherein a bypass ratio is defined as the volume of air passing into said bypass duct compared to the volume of air passing into said compressor, and said bypass ratio being greater than about 6.

* * * * *

UNITED STATES PATENT AND TRADEMARK OFFICE
CERTIFICATE OF CORRECTION

PATENT NO. : 9,879,599 B2
APPLICATION NO. : 13/731133
DATED : January 30, 2018
INVENTOR(S) : Claude Mercier and Gary Collopy It is certified that error appears in the above-identified patent and that said Letters Patent is hereby corrected as shown below:

In the Claims

In Claim 11, Column 6, Line 8; replace "wherein said gear reduction is greater than about 2.5." with --wherein said gear ratio of said gear reduction is greater than about 2.5.--

In Claim 17, Column 6, Line 28; replace "wherein said gear reduction is greater than about 2.5." with --wherein said gear ratio of said gear reduction is greater than about 2.5.--

In Claim 18, Column 6, Line 34; delete "and outer housing"

In Claim 18, Column 6, Line 42; replace "said control" with --a control--

In Claim 18, Column 6, Line 44; replace "said valve" with --said anti-ice valve--

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*